US011200517B2

(12) United States Patent
DeLuca et al.

(10) Patent No.: US 11,200,517 B2
(45) Date of Patent: Dec. 14, 2021

(54) REDISTRIBUTION BASED ON REAL TIME PRESENCE DATA

(71) Applicant: INTERNATIONAL BUSINESS MACHINES CORPORATION, Armonk, NY (US)

(72) Inventors: Lisa Seacat DeLuca, Baltimore, MD (US); Jeremy A. Greenberger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 15/225,421

(22) Filed: Aug. 1, 2016

(65) Prior Publication Data
US 2018/0032926 A1 Feb. 1, 2018

(51) Int. Cl.
*G06Q 10/02* (2012.01)
*H04W 4/021* (2018.01)
(Continued)

(52) U.S. Cl.
CPC .......... *G06Q 10/025* (2013.01); *H04W 4/021* (2013.01); *H04W 4/024* (2018.02);
(Continued)

(58) Field of Classification Search
CPC .................................................. G06Q 10/025
(Continued)

(56) References Cited

U.S. PATENT DOCUMENTS

| 8,725,612 B2 | 5/2014 | Mundinger et al. |
| 9,024,752 B2 | 5/2015 | Tumayan et al. |

(Continued)

FOREIGN PATENT DOCUMENTS

| WO | WO 2013082151 A1 | 6/2013 | |
| WO | WO-2014004183 A2 * | 1/2014 | ............. G01C 21/20 |

OTHER PUBLICATIONS

Yoon, Hyoseok; Zheng, Yu; Xie, Xing; Woo, Woontack. "Social itinerary recommendation from user-generated digital trails". Published Jun. 16, 2011. https://link.springer.com/content/pdf/10.1007/s00779-011-0419-8.pdf (Year: 2011).*

(Continued)

*Primary Examiner* — George Chen
*Assistant Examiner* — Lisa Ma
(74) *Attorney, Agent, or Firm* — Heslin Rothenberg Farley & Mesiti P.C.; Stephanie Carusillo, Esq.

(57) ABSTRACT

A method, computer program product, and system for managing the transportation of an individual. The method includes a processor identifying, based on communicating with location services on a client, a user entering a venue, where the client is a wireless device associated with the user. The processor determined, in real time, a current location of the user within the venue. The processor obtains transportation route information associated with the user. The processor determines, based on the current location of the user and/or the transportation route, an occurrence of a transportation event. Based on the event, the processor determines one or more alternate transportation routes for the user. The processor transmits an alert that includes data related to the one or more alternate transportation routes over a wireless communication channel to the wireless device of the user.

14 Claims, 5 Drawing Sheets

(51) Int. Cl.
    *H04W 4/024*     (2018.01)
    *H04W 4/029*     (2018.01)
    *G06F 9/455*     (2018.01)
    *G01C 21/34*     (2006.01)

(52) U.S. Cl.
    CPC ............ *H04W 4/029* (2018.02); *G01C 21/34* (2013.01); *G06F 9/455* (2013.01)

(58) Field of Classification Search
    USPC .......................................................... 705/6
    See application file for complete search history.

(56) References Cited

U.S. PATENT DOCUMENTS

| | | | |
|---|---|---|---|
| 9,117,223 B1 | 8/2015 | Handel et al. | |
| 9,665,998 B1* | 5/2017 | Shields | G06Q 10/04 |
| 10,783,460 B1* | 9/2020 | Davis | G06Q 10/025 |
| 2002/0178018 A1 | 11/2002 | Gillis et al. | |
| 2006/0155591 A1* | 7/2006 | Altaf | G06Q 10/109 |
| | | | 705/5 |
| 2009/0092125 A1 | 4/2009 | Hoover et al. | |
| 2009/0216547 A1* | 8/2009 | Canora | G06Q 30/02 |
| | | | 705/346 |
| 2012/0030737 A1* | 2/2012 | Pagan | G06F 21/44 |
| | | | 726/5 |
| 2012/0226647 A1* | 9/2012 | Murray | G06Q 10/06 |
| | | | 706/47 |
| 2012/0239289 A1 | 9/2012 | Gontmakkher et al. | |
| 2013/0117057 A1 | 5/2013 | Van Moltke et al. | |
| 2013/0261956 A1* | 10/2013 | Marks | G01C 21/3484 |
| | | | 701/425 |
| 2014/0122153 A1* | 5/2014 | Truitt | G06Q 10/1095 |
| | | | 705/7.19 |
| 2014/0188788 A1 | 7/2014 | Bridgen et al. | |
| 2015/0161528 A1* | 6/2015 | Yalcin | A61K 8/9789 |
| | | | 705/5 |
| 2015/0176997 A1* | 6/2015 | Pursche | G01C 21/3492 |
| | | | 340/905 |
| 2015/0201305 A1* | 7/2015 | Edge | H04W 4/021 |
| | | | 455/456.3 |
| 2015/0348117 A1* | 12/2015 | Busch | G06Q 30/0267 |
| | | | 705/14.44 |
| 2015/0371157 A1* | 12/2015 | Jaffe | G06Q 10/1097 |
| | | | 705/6 |
| 2016/0012514 A1 | 1/2016 | Brown | |
| 2016/0078758 A1* | 3/2016 | Basalamah | G08G 1/0141 |
| | | | 701/118 |
| 2016/0117616 A1* | 4/2016 | Wang | G06Q 10/025 |
| | | | 705/6 |
| 2016/0125327 A1* | 5/2016 | Lamoureux | G06Q 50/14 |
| | | | 705/6 |

OTHER PUBLICATIONS

Nuzzolo et al.; "A New Advanced Traveler Advisory Tool Based On Personal User Preferences", ITSC IEEE 17th International Conference On, Oct. 8-11, 2011, pp. 1561-1566.

Shiftan et al.; "Route Choice Behaviour With Pre-Trip Travel Time Information", IEEE/IET Intelligent Transport Systems, vol. 5, Issue 3, Sep. 2011, pp. 183-189.

* cited by examiner

100

110

One or more programs identify a user entering a transportation venue.

120

One or more programs determine the location of the user within the venue.

130

One or more programs obtain transportation route information associated with the user.

140

One or more programs determine whether there is a transportation event.

150

One or more programs determine if there is an alternate route available to for the user.

160

One or more programs provide the alternate route to the user.

FIG. 1

REDISTRIBUTION BASED ON REAL TIME PRESENCE DATA

BACKGROUND

Transportation providers, including airlines, train lines and bus lines benefit when they are able to make their booking processes more efficient. Maintaining efficiency is particularly problematic when human and environmental conditions create changes to intended travel schedules. For example, many flights are cancelled owing to bad weather and mechanical problems. When a traveler's plans change unexpectedly, he or she can be left to wait at airports, for example, sometimes for hours, until the traveler is able to make new travel plans, including finding a next available flight. In this airport example, in order to make a change, the onus is on the passenger to locate an airline representative and to work with the representative to reserve a spot on a new flight. Thus, the travel industry is in a reactive position—when something unexpected happens, adjustments must be made. There is no ability to anticipate issues and/or automatically make travel plan changes in advance of issues that would enable passengers to reach their destinations as quickly as possible while also limiting the number of delayed passengers.

SUMMARY

Shortcomings of the prior art are overcome and additional advantages are provided through the provision of a computer program product for managing the transportation of a user. The computer program product comprises a storage medium readable by a processing circuit and storing instructions for execution by the processing circuit for performing a method. The method includes, for instance: identifying, by one or more processors, based on communicating with location services on a client, a user entering a venue, wherein the client comprises a wireless device associated with the user; determining, by the one or more processors, in real time, a current location of the user within the venue; obtaining, by the one or more processors, based on the identifying, transportation route information associated with the user, wherein a transportation route comprises a point of origin and a destination; determining, by the one or more processors, based on at least one of the current location of the user or the transportation route, an occurrence of a transportation event; based on the transportation event, determining, by the one or more processors, one or more alternate transportation routes for the user, wherein each of the one or more alternate transportation routes comprises the point of origin and the destination; and transmitting, by the one or more processors, an alert comprising the one or more alternate transportation routes over a wireless communication channel to the wireless device, wherein the alert activates a viewer application on the client to cause data related to the one or more alternate routes to display on the client.

Shortcomings of the prior art are overcome and additional advantages are provided through the provision of a method of managing the transportation of a user. The method includes, for instance: identifying, by one or more processors, based on communicating with location services on a client, a user entering a venue, wherein the client comprises a wireless device associated with the user; determining, by the one or more processors, in real time, a current location of the user within the venue; obtaining, by the one or more processors, based on the identifying, transportation route information associated with the user, wherein a transportation route comprises a point of origin and a destination; determining, by the one or more processors, based on at least one of the current location of the user or the transportation route, an occurrence of a transportation event; based on the transportation event, determining, by the one or more processors, one or more alternate transportation routes for the user, wherein each of the one or more alternate transportation routes comprises the point of origin and the destination; and transmitting, by the one or more processors, an alert comprising the one or more alternate transportation routes over a wireless communication channel to the wireless device, wherein the alert activates a viewer application on the client to cause data related to the one or more alternate routes to display on the client.

Shortcomings of the prior art are overcome and additional advantages are provided through the provision of a system for managing the transportation of a user. The system comprises a memory, a processor in communication with the memory, and program instructions executable by the processor via the memory to perform a method. The method includes, for instance: identifying, by one or more processors, based on communicating with location services on a client, a user entering a venue, wherein the client comprises a wireless device associated with the user; determining, by the one or more processors, in real time, a current location of the user within the venue; obtaining, by the one or more processors, based on the identifying, transportation route information associated with the user, wherein a transportation route comprises a point of origin and a destination; determining, by the one or more processors, based on at least one of the current location of the user or the transportation route, an occurrence of a transportation event; based on the transportation event, determining, by the one or more processors, one or more alternate transportation routes for the user, wherein each of the one or more alternate transportation routes comprises the point of origin and the destination; and transmitting, by the one or more processors, an alert comprising the one or more alternate transportation routes over a wireless communication channel to the wireless device, wherein the alert activates a viewer application on the client to cause data related to the one or more alternate routes to display on the client.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 1 is a workflow diagram depicting aspects of the present technique;

DETAILED DESCRIPTION

Figure 2:
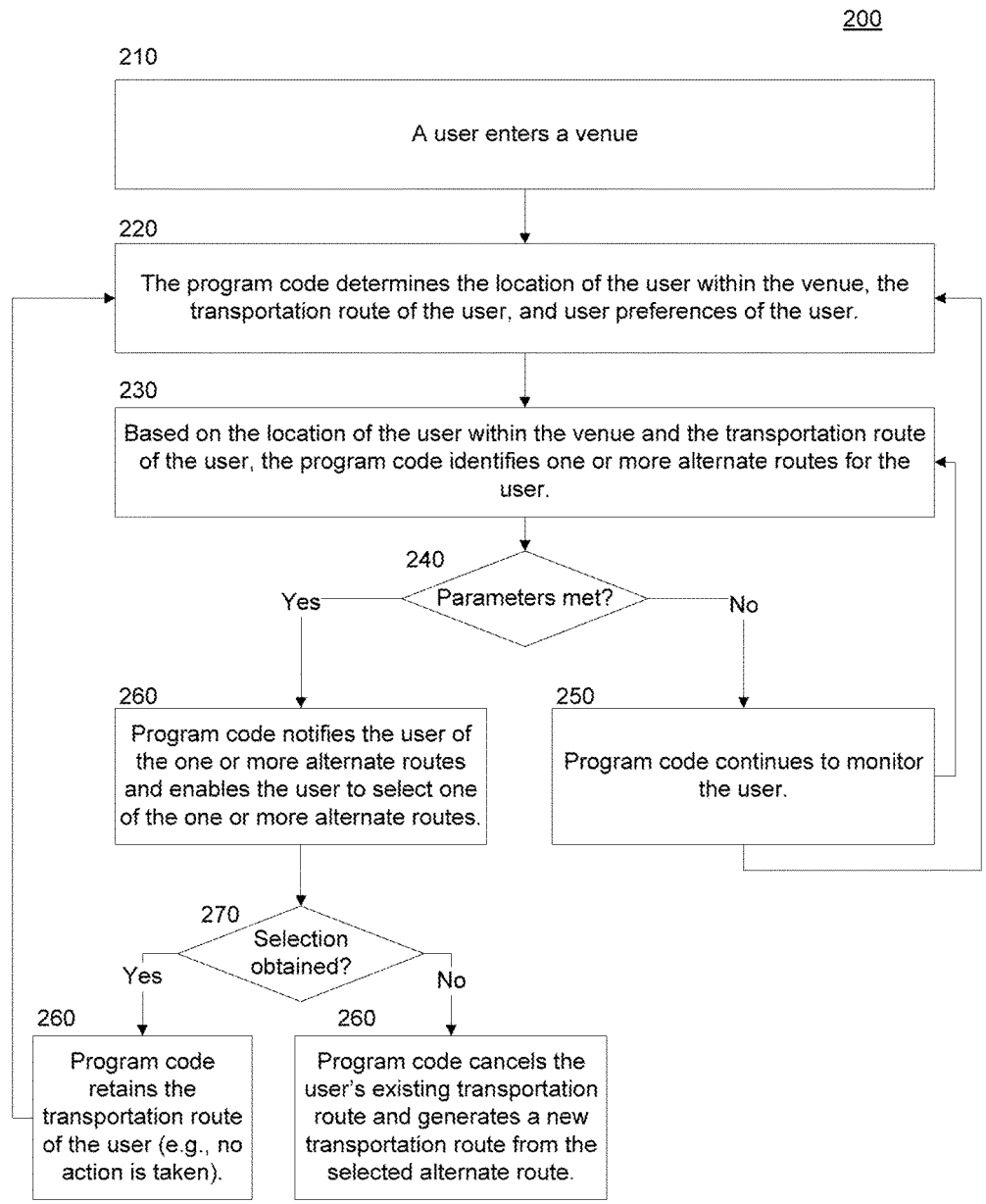
FIG. 2 illustrates certain aspects of some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 4:
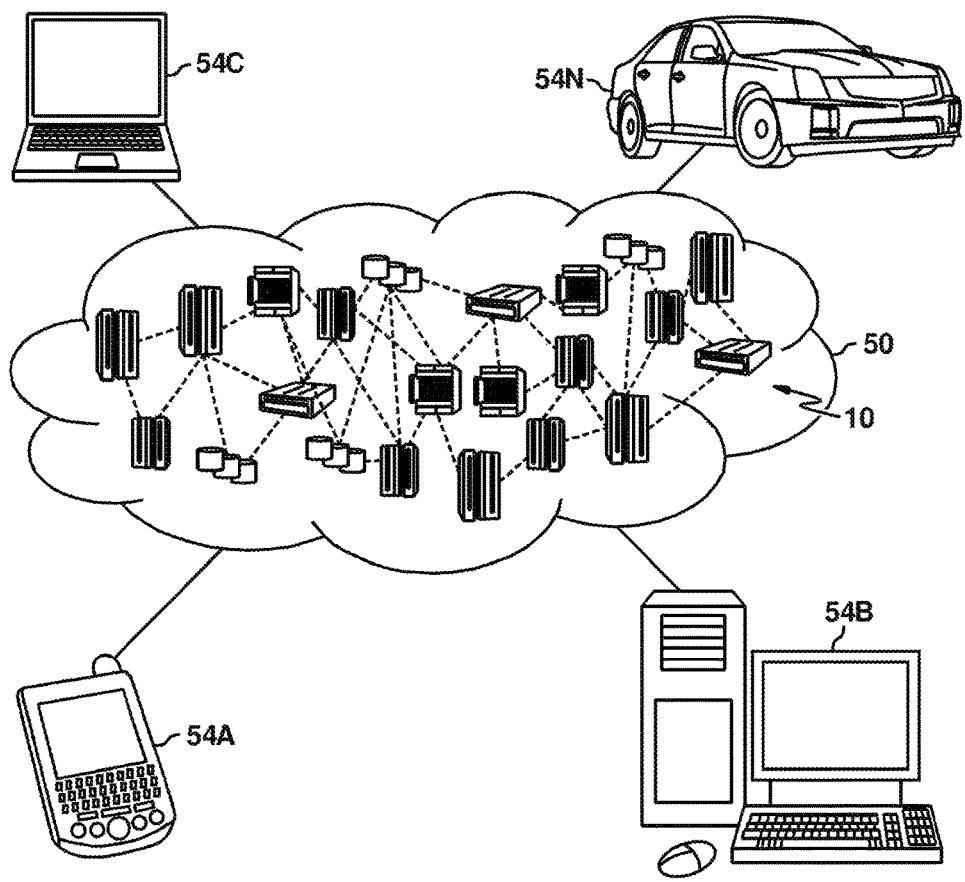
FIG. 4 depicts one embodiment of a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 4 as program/utility 40, having a set (at least one) of program modules 42, may be stored in memory 28.

Aspects of certain embodiments of the present invention provide a method for managing the transportation of an individual in a proactive, as opposed to a reactive, manner. Rather than await an unexpected event, such as a delay or cancelation, which would impact a transportation plan, and attempt to mitigate the problems caused by the issue, aspects of embodiment of the present invention utilize a computer-implemented method to provide a proactive approach to travel that includes continuously monitoring and potentially adjusting a travel plan (i.e., the travel route an individual has planned to take from at least one destination to at least one other destination) in accordance with real time factors to provide a more efficient and effective journey for the traveler, the travel provider, and for fellow travelers, who would be impacted by issues experienced by this traveler. In an embodiment of the present invention, program code executed by one or more processors obtains location data, transportation data, personal data of a traveler, and/or data related to other travelers, to monitor and adjust the travel plan of this given traveler to provide a more efficient plan to arrive at one or more destinations.

Real world applications of embodiments of the present invention are diverse. Although embodiments of the present invention could certainly be utilized by travelers and travel providers in transportation venues, including but not limited to, airports, train stations, bus stations, seaports, and/or other transportation hubs, one of skill in the art will recognize that aspects of the present invention are applicable across many different industries where scheduled events are susceptible to change. For example, as understood by one of skill in the art, an individual with a scheduled event or series of events could potentially benefit from having this plan monitored and adjusted to be made more efficient.

Aspects of some embodiments of the present invention provide advantages to the transportation industry by automatically managing the transportation of individuals, not only when an event occurs that will delay or cancel a planned travel event, but also, when program code executed by one or more processors determines that it would be more efficient and/or effective for the individual to alter his or her travel plan, taking an alternate transportation route, based on both individual and environmental factors. For example, an individual may have arrived at an airport well in advance of his or her flight and rather than wait for the planned flight, program code executing in an embodiment of the present invention may present the individual with alternative routes and/or re-book the individual's travel to enable the individual to take this alternative route, including but not limited to, booking the individual on an earlier flight, where a seat is available. This adjustment not only spares the individual unnecessary wait time, it also increases the fuel efficiency of the airline by booking a traveler in a formerly empty seat, while also decreasing crowding at the terminal. Additionally, the passenger's original seat is now available for another traveler, who could have been waiting on stand-by for the later flight.

Certain embodiments of the present invention provide advantages over existing transportation management methods by enabling travel companies to redistribute passengers and improve the efficiencies of the company, without these changes being detrimental to the travelers. For example, in an embodiment of the present invention, the program code selects individuals for alternative travel routes based on criteria, while filtering out unqualified passengers (e.g., individuals who have not cleared security). In addition to filtering out unqualified passengers, in certain embodiments of the present invention, program code prioritize the people based on various factors, such as location in the venue, that render changing the transportation route of one user more favorable than changing the transportation route of another. Utilization of the present invention would avoid the inefficient practice of moving individuals to earlier travel opportunities based only on the place that these individuals obtain in a line, but would instead identify all qualified travelers for redistribution, enabling airlines and other travel providers to shift individuals to more convenient travel opportunities without causing delays. The increased ability to redistribute passengers more logically would increase both revenue and customer satisfaction.

The described improvements to the travel industry offered by embodiments of the present invention are inextricably tied to computer technology. Embodiments of the present invention utilize positioning systems and location data, customer profile information, and/or route information, in order to monitor and adjust the transportation plan of the individual. In monitoring and adjusting of the travel plan of an individual, program code obtains this information in real time, such as the location of the individual within a venue, and communicates any suggested or implemented changes to an individual's travel route in real time, so that the individual will be aware of any plan changes and can follow the new plan. The ability to collect location information and travel information and react to these factors in real time is enabled by utilizing one or more computing nodes, including a mobile device of the passenger. Thus, as will be described in more detail herein, in an embodiment of the present invention, program code utilizes a communications connection, such as the Internet, to monitor the location of an individual within a travel venue and to access data and generate and communicate changes to the individual's travel plan, in real time.

In an embodiment of the present invention, the program code communicates changes to an individual's travel plan to a computing device that is accessible to the traveler. The program code utilizes this device to alert a traveler to any changes to the travel plan and thus, in addition to being inextricably tied to computer technology, the invention as a whole amounts to significantly more than organizing and comparing data as it addresses the Internet-centric challenge of alerting an individual with time sensitive information when the individual is not engaged online (e.g., a traveler attempting to navigate a travel hub is at many times not engaged with his or her computing device).

Embodiments of the present invention provide a computer-implemented method for monitoring and adjusting the travel plan of an individual by making changes to the individual's transportation route and alerting the individual to those changes. In embodiments of the present invention, program code executing on one or more processors provides a travel route application with a viewer to an individual (e.g., a remote traveler) for installation on the individual's computing device. The program code obtains data from the individual's computing device, for example, over a private or public connection, such as the Internet, and, in some embodiments of the present invention, from additional computing nodes. The program code obtains data related to the identity of the individual entering a transportation venue, the planned transportation route of the individual, and, optionally user preferences related to travel. The program code also determines a location of the individual within the transportation venue. The program code utilizes this data to identify an alternate route for the individual based on determining the location of the individual in the venue and one or more of transportation events (e.g., earlier route available, cancellation of current route, comparable route with earlier arrival or departure time, and/or actual or predicted weather delays), or user preferences.

In an embodiment of the present invention, the program code transmits the alternate route over a wireless communication channel to a wireless device associated with the individual and this alert activates the viewer application to cause the alternate route to display on the remote computer. In an embodiment of the present invention, the program code automatically changes the individual's transportation route to the alternate route. In another embodiment of the present invention, the program code solicits a response from the user through the display in the user's computing device, requesting feedback for a proposed alternate route. Based on obtaining a confirmation, the program code changes the individual's transportation route to the alternate route.

To illustrate certain aspects of the present invention, FIG. 1 depicts a workflow 100 of an embodiment of the present invention while FIG. 2 provides a use case 200 to illustrate how utilizing aspects of an embodiment of the present invention can affect the travel route of a given user.

Referring to FIG. 1, in an embodiment of the present invention, program code identifies a user entering a transportation venue, including but not limited to an airport, a seaport, a train station, or a bus station (110). The program code determines the location of the user within the venue (120). In an embodiment of the present invention, the program code utilizes one or more existing application on the user's personal computing device to identify this user and track the movement of the user within the venue and/or installs an application on the user's device that enables the program code to identify the user and track the user's movement. For example, in an embodiment of the present invention, a user may enable location services on his or her computing device, which can be accessed by the program code over a communications connection, such as a wireless connection or the Internet. Once the user has enabled the location services, the program code utilizes the services to track the location of the user and accesses additional data on the device to identify the user. In an embodiment of the present invention, the user may adjust the privacy features on his or her device to enable the program code to identify and track the user. The accessible data may be limited to the information needed to locate the user within the venue and determine the user's planned transportation route from the venue.

Certain embodiments of the present invention also include custom location-tracking services and systems, however, the utilization of known tools can decrease implementation costs. Thus, in embodiments of the present invention, the program code may interact with off-the-shelf location applications, known tools, which may be installed and/or executed on the user's computing device, in order to track the user's location within a venue. For illustrative purposes only, the utilization of known tool IBM® Presence Insights is described herein. However, one of skill in the art will recognize that the program code can interface with similar known tools in order to identify users and track the movement of these users within a given venue, in accordance with certain aspects of an embodiment of the present invention. IBM® Presence Insights is a product of International Business Machines Corporation. IBM® is a registered trademark of International Business Machines Corporation, Armonk, N.Y., US.

In an embodiment of the present invention, the program code utilizes components of IBM® Presence Insights to provide identifying information associated with the user, as well as to provide location based analytics, to the program code, so that the program code can identify the user entering the venue (110) and (e.g., continually) determine the location of the user within the venue (120).

IBM® Presence Insights uses sensors to collect and analyze location data. The program code in an embodiment of the present invention accesses this data to identify patterns and actionable events in order, for example, to qualify an individual for an alternate route and to determine a viable alternate route for the user without inconveniencing the user. The program code in an embodiment of the present invention accesses an IBM® Presence Insights client on a user's mobile device to obtain information related to the device owner's trajectory and movement behavior, as it relates to defined site and zone regions, including different parts of the venue.

Utilizing aspects of IBM Presence Insights, in an embodiment of the present invention, the program code identifies the individual (e.g., 110) by detecting the mobile device of the individual within a venue, based on the mobile device communicating through radio signals using various protocols (e.g., Bluetooth Low Energy (BLE), Wi-Fi 802.11 on 2.4 GHz and 5 GHz radio communication protocols). Upon detecting the device, the program identifies the device, and therefore associates the device with the user and continues tracking the device to determine the location of the user within the venue (e.g., 120) by using a supported protocol, including a Globally Unique Identifier (GUID) that was assigned to the device and/or the MAC address for the device. The program may also access personally identifiable information (PII) on this device. To address privacy concerns, the PII, including the MAC address or GUID, may be encrypted by using a public key.

Identifying the user and tracking his or her movement enables the program code to collect user preferences, which the program code can later utilize in determining an alternate route. These preferences, which the program code establishes by identifying and tracking the user within the venue, include, but are not limited to, the distance of the user from the departure points of additional routes within the venue and the experienced wait time experienced by the user. In an embodiment of the present invention, the program code may collect additional information from other sources based on the identity information, for example, in an embodiment of the present invention, the program code obtains social sentiments expressed by the user while at the venue from the user's social media accounts. In order to obtain the social sentiment of the individual, in an embodiment of the present invention, the program code obtains recorded communications between the user and travel representative within the venue. In another embodiment of the present invention, the program code obtains social sentiments of a user by searching social media based on the identifying data to locate any comments the user provided regarding the transportation experience, within a relevant timeframe.

Returning to FIG. 1, based on identifying a user, the program code obtains transportation route information associated with the user (130). As aforementioned, in an embodiment of the present invention, the program code may access the user's itinerary on the user's device. In a further embodiment of the present invention, the program code may utilize the identifying information obtained from the user's device to locate a transportation record associated with the user in a transportation booking system. In an embodiment of the present invention, the program code may represent one or more modules of a transportation booking system that may be utilized by travel professionals at the given venue. In a further embodiment of the present invention, at least a portion of the program code may execute on the client device of the user and may access the booking system over a wireless communications connections. The transportation route information may also include user preferences, which the program code can later utilize in determining an alternate route. These user preferences include, but are not limited to: anticipated wait time (before departure and between connections), party size, and seating preferences.

Returning to FIG. 1, in an embodiment of the present invention, the program code determines whether there is a transportation event (140). Transportation events include, but are not limited to, the availability of accommodations for the user on an earlier route (given that the program code has determined that the user is in a location in the venue that would make taking this option possible), the cancellation of a current route, the availability of a comparable route with an additional convenience (e.g., an earlier arrival or departure time, a free upgrade to a better seating option, a free meal, more diverse entertainment options), a delay of the current route, and/or the a probability for a delay of the current route. In an embodiment of the present invention, the program code determines whether there is a probability of a delay (i.e., exceeding a pre-defined likelihood threshold) by utilizing either a custom or known cognitive agent.

In certain embodiment of the present invention, the utilization of a known cognitive agent, such as the IBM Watson® Application Program Interface (API), a product of International Business Machines Corporation, can decrease implementation costs. IBM Watson® is a registered trademark of International Business Machines Corporation, Armonk, N.Y., US. The data extraction and analysis characteristics of the IBM Watson® API provide the advantage of enabling the program code to match the transportation route and currently available weather predictions with historical data, with a certain confidence level, thus adding additional intelligence to any prediction of a possible delay due to inclement weather. For example, in an embodiment of the present invention, the program code utilizes established weather patterns to reflect confidence levels, e.g., classifying the likelihood of a delay in a given transportation route with a rating of "likely" based on historical data related to similar weather conditions and the same or similar anticipated routes. In an embodiment of the present invention, the program code utilizes the IBM Watson® API to assess the complexity of the data by using machine learning technics and evolving estimates over time, per transportation route. Over time, the machine learning techniques would enable the program code to improve iteration estimation and to build historical data so when assessing the likelihood of a delay, the program code generates increasingly accurate predictions of probable travel delays.

Referring to FIG. 1, in an embodiment of the present invention, based on the location of the user within the venue, the transportation route information, and the presence of an event, the program determines if there is an alternate route available to for the user (150). For example, based on the user arriving early at a transportation venue and having cleared security, the program code may determine that an earlier trip (e.g., flight, train, boat) is available to the user.

In determining an alternate route for the user, in an embodiment of the present invention, the program code also evaluates whether the user meets criteria to take a given alternate route. What may first appear to be an ideal route may not be a viable option for a user based on, for example, the user being too far away from the terminal that the alternate route departs from and/or being part of a party of six and uninterested in re-booking to a different route without the rest of the group. Criteria evaluated by the program code may include any trip or user-specific factors that could make an alternate route logistically unavailable for a user. Thus, in an embodiment of the present invention, once the program code identifies a possible route, it utilizes this criteria to evaluate whether the route is a possibility for the user.

In an embodiment of the present invention where the program code evaluates user criteria to qualify a user for an alternate route, the criteria may include the aforementioned user preferences obtained by the program code. As such, the criteria includes, but is not limited to, whether the user has passed through security, the physical distance of the user within the venue from the departure point of the alternate route, the wait time of the user, the social sentiment of the user (e.g., whether the user has already expressed that he or she is angry with the customer service or wait time), and/or the accommodations available on the alternate route versus the party (e.g., if travelling with a family of four and only two seats available, the criteria is not met).

Returning to FIG. 1, based on determining that there is an alternate route available, in an embodiment of the present invention, the program code provides the alternate route to the user (160). In an embodiment of the present invention, the program code may provide the user with one or more alternate routes. In an embodiment of the present invention, the program code alerts the user to the new route possibility in real time by populating the details of the route on a graphical user interface (GUI) on the user's computing device.

In an embodiment of the present invention, the program code solicits input from the user through the GUI on the user's device, regarding whether the user would like to accept the alternate route. In an embodiment of the present invention, based on obtaining an acceptance of the alternate route for the user, the program code changes the user's travel route and alerts the user to the new route details, including whether the user should move to a new location in the venue to access the new route. Based on obtaining a rejection of the alternate route, the program code does not make changes to the user's transportation route. In another embodiment of the present invention, one the program code has determined that the user meets the criteria for an alternative route, the program code automatically changes the user's transportation route to the alternate route and alerts the user to the change.

FIG. 2 is a use case 200 that depicts, for illustrative purposes only, the travel experience of a given user utilizing aspects of an embodiment of the present invention at a transportation venue. Initially, a user enters a venue (210). As discussed above, a computing device utilized by the user includes location services, for example, an application that interacts sensors at the venue, such that the sensors can collect data the program code can utilize to determine the location of the user. The client device may also include one or more of a global positioning system (GPS) interface, a gyroscope, a GPS tracking device, and/or a device locator application. The program code determines the location of the user within the venue, the transportation route of the user, and user preferences of the user (220). Based on the location of the user within the venue and the transportation route of the user, the program code identifies one or more alternate routes for the user (230).

The program code evaluates, based on the user preferences and the location of the user, whether the users meets parameters of the one or more alternate routes (240). For example, one of the alternatives identified may depart from a location too far from the location of the user and the user would likely miss the alternate route (e.g., flight, train, bus) if he or she attempted to take it. Thus, the user would not meet the parameters of this alternative. Also, the user may not have cleared security, at which point the user would not be eligible for changing routes and would not meet the parameters of any of the one or more alternate routes. However, the program code in an embodiment of the present invention continues to monitor the user and as parameters change (e.g., the location of the user, the details on the intended transportation route) to continue both to identify additional alternate routes and/or to determine if the user is now eligible for the original one or more alternate routes. The program code utilizes temporal conditions to identify flights and therefore, both the inquiries and the results of the analysis that the program code performs can change over the course of time. Thus, in an embodiment of the present invention, the program code continues to monitor the user (250) and the program code identifies one or more alternate routes for the user (230). In an embodiment of the present invention, in parallel with identifying new alternative routes, the program code also continuously evaluates whether the users meets parameters of the one or more alternate routes (240).

Provided that the user meets the parameters of the one or more alternate routes, the program code notifies the user of the one or more alternate routes and enables the user to select one of the one or more alternate routes (260). The user may either select an alternate route, provide no response, or reject the suggested one or more alternate routes (270). Based on obtaining an acceptance of a route from the one or more alternate routes, the program code cancels the user's existing transportation route and generates a new transportation route from the selected alternate route (270). For example, the program code may reserve a new flight for the user and cancel the user's existing flight reservation. Based on obtaining a rejection (and, in some embodiments, no response for a pre-defined amount of time), the program code retains the transportation route of the user (280). The program code does not change any reservations that the user previously held.

In the event that the user either rejects the one or more alternate routes proposed by the program code or does not respond within a pre-defined period of time, the program code, because of the temporal aspects of embodiments of the present invention the present invention, the program code can continue to monitor (determine) the location of the user within the venue, the transportation route of the user, and user preferences of the user (220), identity one or more alternative routes for the user (330) until the user accepts an alternate route or no alternative route is available.

As illustrated in FIGS. 1-2, embodiments of the present invention include program code that identifies, based on communicating with location services on a client, a user entering a venue, where the client is a wireless device associated with the user. The program code determines, in real time, a current location of the user within the venue and obtains, based on the identifying, transportation route information associated with the user, wherein a transportation route comprises a point of origin and a destination. The program code determined, based on at least one of the current location of the user or the transportation route, an occurrence of a transportation event. Based on the transportation event, the program code determines one or more alternate transportation routes for the user, where each of the one or more alternate transportation routes includes the point of origin and the destination. The program code transmits an alert including the one or more alternate transportation routes over a wireless communication channel to the wireless device, where the alert activates a viewer application on the client to cause data related to the one or more alternate routes to display on the client. In an embodiment of the present invention, the program code provides the viewer application over a wireless connection to the client, the view application, for installation on the client. The venue may include an airport, a train station, a bus station, a seaport, or a transportation hub.

In an embodiment of the present invention, when the program code identifies the user, the program code also obtains user preference information from the at least one of: the client, the transportation route information, or the current location. The program code may then determine the one or more alternate transportation routes for the user based on a portion of the user preferences.

In an embodiment of the present invention, to determine the one or more alternate transportation routes, the program code identifies, based on the current location the transportation route information, one or more prospective alternate transportation routes for the user, where the prospective alternate transportation routes include the point of origin and the destination and the program code selects from the one or more prospective alternate transportation routes, the one or more alternate transportation routes, based on comparing parameters of the prospective alternate transportation routes to the user preferences and identifying the one or more alternate transportation routes as compatible with the user preferences. In an embodiment of the present invention, the user preference include at least one or: a distance to a new route departure from the current location, an arrival time, a departure time, a layover location, wait time of the user, social sentiment of the user, or party size of the user.

In an embodiment of the present invention, the transportation event includes at least one of: an earlier available transportation route, a cancellation of the transportation route, a transportation route with a different arrival time, a transportation route with a different departure time, a delay of the transportation route, or a potential weather delay of the transportation route.

In an embodiment of the present invention, the transportation event includes the potential weather delay of the transportation route and the program code determines the occurrence of a transportation event by: obtaining historical information related to the transportation route and past weather events affecting the transportation route, parsing the historical information by applying a statistical information extraction to the information, based on the statistical information extraction, generating at least one value for a an estimate attribute reflecting a predicted probability for a weather delay of the transportation route, and determining, based on the predicted probability exceeding a pre-determined threshold, the potential weather delay of the transportation route.

In an embodiment of the present invention, the program code additionally obtains a selection of one of the one or more alternate transportation routes from the client, cancels travel reservations related to the transportation route, and generates travel reservations related to the selected one of the one or more alternate transportation routes. The program code may also notify the user by transmitting a message including the travel reservations related to the selected one of the one or more alternate transportation routes over a wireless communication channel to the wireless device.

In an embodiment of the present invention, the program code determines, after a pre-defined period of time, a new current location of the user within the venue. The program code updates the one or more alternate transportation routes for the user, based on a change of the current location to the new current location, and transmits a new alert, including updates to the one or more alternate transportation routes, over a wireless communication channel to the wireless device, where the alert activates a viewer application on the client to cause the updates to the one or more alternate routes to display on the client.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 3:
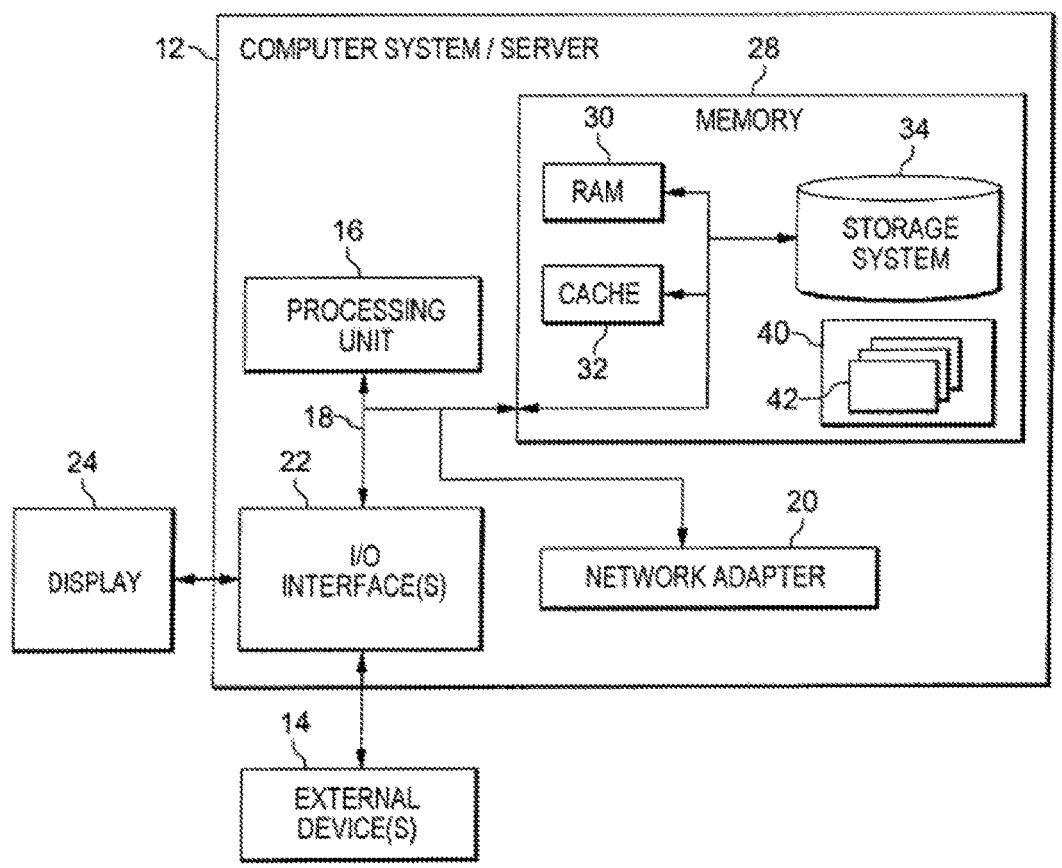
FIG. 3 depicts one embodiment of a cloud computing node.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, both the client device and/or any server utilized to contact the client device, and/or any server that comprises a portion of a travel booking system utilized by an embodiment of the present invention, can be understood as a cloud computing node 10 (FIG. 3) and if not a cloud computing node 10, then a general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
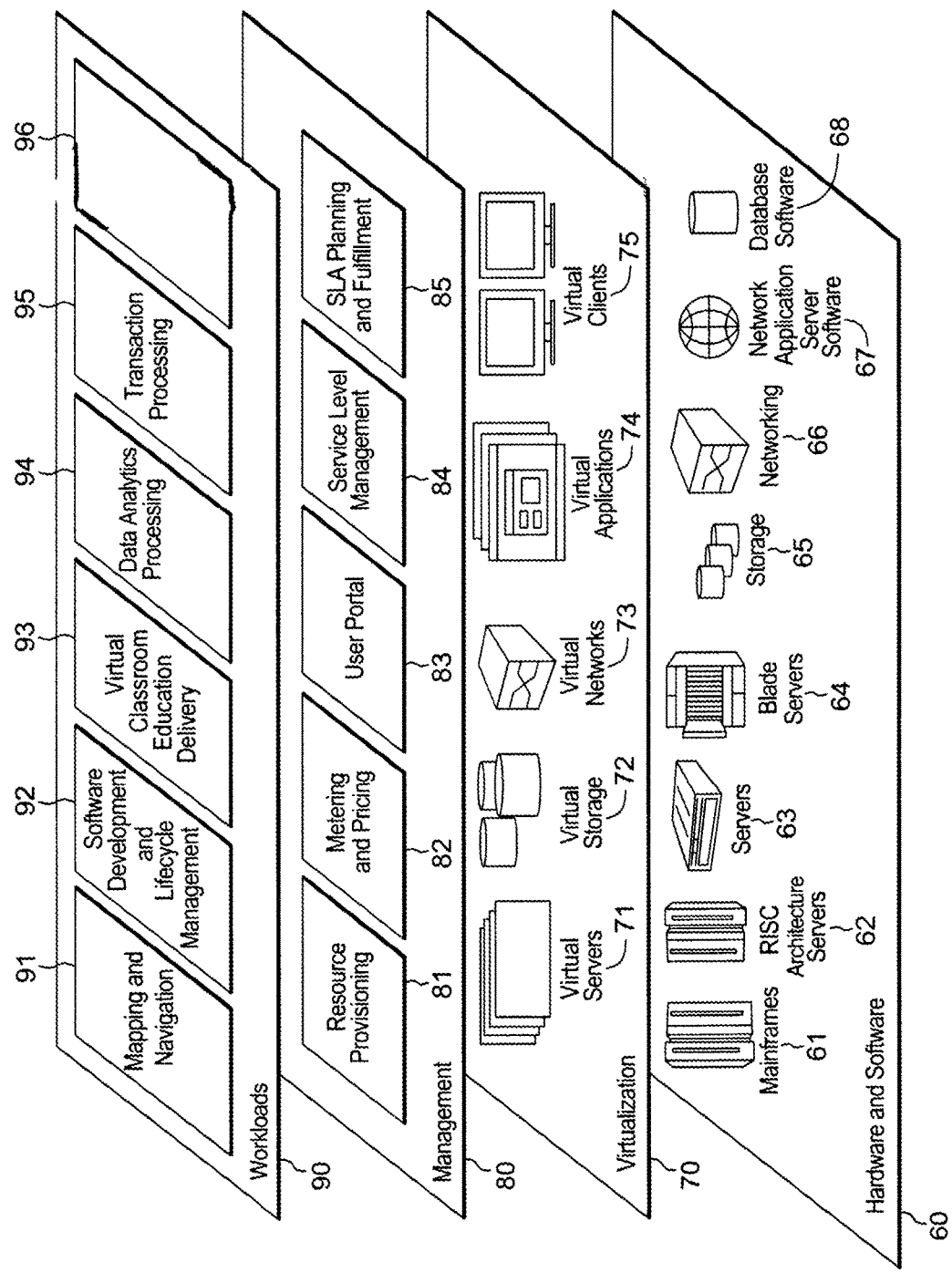
FIG. 5 depicts one example of abstraction model layers.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below, which may include maintaining VPD at a VPD location the computer system. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and determining the location of a user within the venue, the transportation route of the user, and user preferences of the user, for a user with a device with connectivity to a cloud computing node.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   identifying, by one or more processors, based on communicating with location services on a client, a user entering a venue, wherein the client comprises a wireless device associated with the user;
   determining, by the one or more processors, in real time, a current location of the user within the venue;
   obtaining, by the one or more processors, based on the identifying, transportation route information associated with the user, wherein the transportation route information comprises a transportation route comprising a point of origin and a destination;
   obtaining, by the one or more processors, user preference information from the current location of the user within the venue and at least one of: the client, or the transportation route information;
   determining, by the one or more processors, based on the current location of the user within the venue and the transportation route and based on a predicted probability exceeding a pre-determined threshold, based on a determination by a cognitive agent, an occurrence of a transportation event, wherein the transportation event comprises a delay in the transportation route;
   based on the transportation event, determining, by the one or more processors, one or more alternate transportation routes for the user, wherein each of the one or more alternate transportation routes comprises the point of origin and the destination, wherein the determining the one or more alternate transportation routes for the user comprises:
      identifying, by the one or more processors, based on the current location of the user within the venue and the transportation route information, one or more prospective alternate transportation routes for the user, wherein the prospective alternate transportation routes comprise the point of origin and the destination; and
      selecting, by the one or more processors, from the one or more prospective alternate transportation routes, the one or more alternate transportation routes, based on comparing parameters of the prospective alternate transportation routes to the user preferences and identifying the one or more alternate transportation routes as compatible with the user preferences, wherein the user preferences comprise a distance to a new route departure location within the venue from the current location of the user within the venue and social sentiment of the user regarding the customer service or wait time; and
   transmitting, by the one or more processors, an alert comprising the one or more alternate transportation routes over a wireless communication channel to the wireless device, wherein the alert activates a viewer application on the client to cause data related to the one or more alternate routes to display on the client.

2. The computer-implemented method of claim 1, wherein the user preferences further comprise at least one of: an arrival time, a departure time, a layover location, wait time of the user, or party size of the user.

3. The computer-implemented method of claim 1, further comprising:
   providing, by the one or more processors, over a wireless connection to the client, the viewer application for installation on the client.

4. The computer-implemented method of claim 1, further comprising:
   responsive to the transmitting, obtaining, by the one or more processors, a selection of one of the one or more alternate transportation routes from the client; and
   canceling, by the one or more processors, travel reservations related to the transportation route; and
   generating, by the one or more processors, travel reservations related to the selected one of the one or more alternate transportation routes.

5. The computer-implemented method of claim 4, further comprising:
transmitting, by the one or more processors, a message comprising the travel reservations related to the selected one of the one or more alternate transportation routes over a wireless communication channel to the wireless device.

6. The computer-implemented method of claim 1, wherein the venue is selected from the group consisting of: an airport, a train station, a bus station, a seaport, and a transportation hub.

7. The computer-implemented method of claim 1, further comprising:
determining, by the one or more processors, after a pre-defined period of time, a new current location of the user within the venue;
updating, by the one or more processors, the one or more alternate transportation routes for the user, based on a change of the current location of the user within the venue to the new current location of the user within the venue; and
transmitting, by the one or more processors, a new alert comprising updates to the one or more alternate transportation routes over a wireless communication channel to the wireless device, wherein the alert activates a viewer application on the client to cause the updates to the one or more alternate routes to display on the client.

8. The computer-implemented method of claim 1, wherein the identifying the user entering the venue comprises:
detecting, by the one or more processors, the wireless device, based on communicating with the wireless device utilizing radio signals of a radio communication protocol; and
based on detecting the wireless device, associating, by the one or more processors, the wireless device with the user.

9. The computer-implemented method of claim 8, wherein determining the current location of the user within the venue comprises:
continuously tracking, by the one or more processors, the wireless device to determine the current location of the user within the venue by utilizing a supported protocol of the wireless device, wherein the supported protocol is selected from the group consisting of: a Globally Unique Identifier (GUID) assigned to the wireless device and a MAC address for the wireless device.

10. A computer program product comprising:
a non-transitory computer readable storage medium readable by one or more processors and storing instructions for execution by the one or more processors for performing a method comprising:
identifying, by the one or more processors, based on communicating with location services on a client, a user entering a venue, wherein the client comprises a wireless device associated with the user;
determining, by the one or more processors, in real time, a current location of the user within the venue;
obtaining, by the one or more processors, based on the identifying, transportation route information associated with the user, wherein the transportation route information comprises a transportation route comprising a point of origin and a destination;
obtaining, by the one or more processors, user preference information from the current location of the user within the venue and at least one of: the client, or the transportation route information;
determining, by the one or more processors, based on the current location of the user within the venue and the transportation route and based on a predicted probability exceeding a pre-determined threshold, based on a determination by a cognitive agent, an occurrence of a transportation event, wherein the transportation event comprises a delay in the transportation route;
based on the transportation event, determining, by the one or more processors, one or more alternate transportation routes for the user, wherein each of the one or more alternate transportation routes comprises the point of origin and the destination, wherein the determining the one or more alternate transportation routes for the user comprises:
identifying, by the one or more processors, based on the current location of the user within the venue and the transportation route information, one or more prospective alternate transportation routes for the user, wherein the prospective alternate transportation routes comprise the point of origin and the destination; and
selecting, by the one or more processors, from the one or more prospective alternate transportation routes, the one or more alternate transportation routes, based on comparing parameters of the prospective alternate transportation routes to the user preferences and identifying the one or more alternate transportation routes as compatible with the user preferences, wherein the user preferences comprise a distance to a new route departure location within the venue from the current location of the user regarding the customer service or wait time; and
transmitting, by the one or more processors, an alert comprising the one or more alternate transportation routes over a wireless communication channel to the wireless device, wherein the alert activates a viewer application on the client to cause data related to the one or more alternate routes to display on the client.

11. The computer program product of claim 10, further comprising:
responsive to the transmitting, obtaining, by the one or more processors, a selection of one of the one or more alternate transportation routes from the client; and
canceling, by the one or more processors, travel reservations related to the transportation route; and
generating, by the one or more processors, travel reservations related to the selected one of the one or more alternate transportation routes.

12. The computer program product of claim 10, wherein the user preferences further comprise at least one of: an arrival time, a departure time, a layover location, wait time of the user, or party size of the user.

13. The computer program product of claim 10, the method further comprising:
providing, by the one or more processors, over a wireless connection to the client, the viewer application for installation on the client.

14. A system comprising:
a memory;
one or more processors in communication with the memory; and
program instructions executable by the one or more processors via the memory to perform a method, the method comprising:

identifying, by the one or more processors, based on communicating with location services on a client, a user entering a venue, wherein the client comprises a wireless device associated with the user;

determining, by the one or more processors, in real time, a current location of the user within the venue;

obtaining, by the one or more processors, based on the identifying, transportation route information associated with the user, wherein the transportation route information comprises a transportation route comprising a point of origin and a destination;

obtaining, by the one or more processors, user preference information from the current location of the user within the venue and at least one of: the client, or the transportation route information;

determining, by the one or more processors, based on the current location of the user within the venue and the transportation route and based on a predicted probability exceeding a pre-determined threshold, based on a determination by a cognitive agent, an occurrence of a transportation event, wherein the transportation event comprises a delay in the transportation route;

based on the transportation event, determining, by the one or more processors, one or more alternate transportation routes for the user, wherein each of the one or more alternate transportation routes comprises the point of origin and the destination, wherein the determining the one or more alternate transportation routes for the user comprises:

identifying, by the one or more processors, based on the current location of the user within the venue and the transportation route information, one or more prospective alternate transportation routes for the user, wherein the prospective alternate transportation routes comprise the point of origin and the destination; and selecting, by the one or more processors, from the one or more prospective alternate transportation routes, the one or more alternate transportation routes, based on comparing parameters of the prospective alternate transportation routes to the user preferences and identifying the one or more alternate transportation routes as compatible with the user preferences, wherein the user preferences comprise a distance to a new route departure location within the venue from the current location of the user within the venue and social sentiment of the user regarding the customer service or wait time; and transmitting, by the one or more processors, an alert comprising the one or more alternate transportation routes over a wireless communication channel to the wireless device, wherein the alert activates a viewer application on the client to cause data related to the one or more alternate routes to display on the client.

* * * * *